:::::::::::::::::::::::::::::::::::::::::::::::::::::::::::::::::::::::::::::::::::::::::::::::::::::::::::::::::::::::::::::::::::::::::::::::::

2,956,891
METHOD OF MAKING POROUS PRODUCTS FROM VOLCANIC GLASS AND ALUMINA

Alfred E. Booth, East Hempfield Township, Lancaster County, and Robert L. Hess, Clearfield, Pa., assignors to Armstrong Cork Company, Lancaster Pa., a corporation of Pennsylvania No Drawing. Filed Mar. 9, 1959, Ser. No. 797,857

3 Claims. (Cl. 106—40)

This invention relates to a method of making porous or cellular products from naturally occurring silicious materials, such as volcanic glass, and more specifically pumice, obsidian, and the like.

The present invention is related to the copending application of Alfred E. Booth, one of the joint inventors of the present invention, Serial No. 795,328, filed February 25, 1959, entitled "Method of Making a Foamed and Expanded Product from Volcanic Glass." In that application, there is disclosed the manufacture of porous or cellular products from powdered volcanic glass. Sodium nitrate and sodium hydroxide are used as a fluxing and gassing agent for the volcanic glass. The batch is fired at a temperature which fluxes and softens the volcanic glass and simultaneously releases gas from the fluxing and gassing agent into the softened volcanic glass for the formation of pores or cells therein. Firing is continued until gas released into the softened batch produces a substantially expanded porous or cellular product. Generally, an expansion of eight to ten times normal volume is effected. This expanded product is reground to a fine powder. This powder is refired, and the fluxing and gassing agent which has been chemically and physically combined with the volcanic glass in the cell walls as the result of the initial firing serves to effect reexpansion of the mass upon such refiring. This provides a porous or cellular product with an unusually uniform cell structure. For simplicity of description, this process will be referred to as the regrinding and refiring technique.

The copending application provides complete information on the process, including firing temperatures and cycles, proportioning of ingredients, mol ratio of the sodium nitrate-sodium hydroxide mixture of the fluxing and gassing agent, and other factors. Reference is made to the copending application for such detailed information which is incorporated herein by reference.

An object of the present invention is to provide an improved cell or pore structure in products made from fluxed and expanded volcanic glass powder by the regrinding and refiring technique.

Another object of the invention is to improve the thermal shock resistance of products made from fluxed and expanded volcanic glass powder made by the regrinding and refiring technique.

A further object of the invention is to provide better process control in pore or cell formation and distribution during refiring of a volcanic glass batch by preventing sagging or collapse of the cells or pores.

An additional object of the invention is to improve the physical properties, especially hardness, strength, and small cell or pore structure of products made from fluxed and expanded volcanic glass by the regrinding and refiring technique.

Other objects of the invention will be clear from the detailed description of an embodiment of the invention given below.

According to the invention, there is added to the reground batch of volcanic glass, with its chemically and physically combined fluxing and gassing agent, a small quantity of finely ground alumina. The batch then is refired and foamed or expanded to produce a porous or cellular expanded product. The expanded product is heat stabilized, cooled, and annealed.

The following example will illustrate one mode of practicing the invention:

40 parts of volcanic glass, specifically the naturally occurring porous silica-alumina material mined at Idaho Falls, Idaho, and known as Idolite, are ground to a fine powder in a ball mill or hammer mill. The size of the particles should be as small as economically feasible, with particles in the range of minus 100 mesh or lower being preferred. A fluxing and gassing agent formed of 7 parts by weight of a mixture of 2 parts by weight of sodium nitrate and 5 parts by weight of sodium hydroxide are dissolved in about 7 parts by weight of water.

This represents about an 11.4 alkali or $Na_2O$ addition to the volcanic glass, based on the weight of the glass, and the mixture is in a 1:5.3 mol ratio of sodium nitrate to sodium hydroxide.

The solution thus prepared is mixed with the powdered volcanic glass and serves to dampen it. The mass is dried. If there is any tendency for the mass to cake, it is crushed or pulverized. About 10 pounds of the material are spread as a substantially uniform layer over the bottom of a stainless steel pan having a bottom about 13"×25" and side walls about 4" high. This provides a layer of material about ½" thick which is adequate upon expansion to produce a 4"–5" thick slab of expanded material. The mass then is delivered into a zone heated furnace where it is first preheated to about 1200° F. for about 30 minutes and then is transferred to a firing zone where it is fired at a temperature of about 1450° F. to 1500° F. for 30 minutes or until a substantial expansion has been effected, in the order of eight to ten times the original volume. The expanded mass is cooled down rapidly and may shatter and split as the temperature falls below the normal annealing temperature. The mass is removed from the pan, generally as pieces, after the material has cooled sufficiently to permit handling. The pieces then are reduced to a powder in a ball mill or hammer mill. The size of the particles again should be as small as economically feasible, with particles in the range of 100 mesh or lower being preferred.

About 3% of alumina ($Al_2O_3$) is mixed with the reground batch. For example, 9 pounds of the reground batch are mixed with .27 pounds of alumina. The alumina should be finely ground and a powder of about minus 300 mesh has been found to give very good results. Thorough intermixing of the alumina with the reground batch is important for best results.

This mass is distributed as a substantially uniform dry layer in the bottom of a closed stainless steel mold about 13" x 25" x 4". The lid then is clamped onto the mold, and the mass is preheated to about 1200° F. for about 30 minutes. The mold is moved into the firing zone and the mass is refired at about 1500° F. to 1550° F. for about 30 minutes. This refiring causes the mass to reexpand and fill the mold. After refiring, the mold is passed into a stabilizing zone where the temperature of the furnace is about 1200° F. The mold is held in this zone for about 30 minutes and then is passed into a cooling zone where the temperature of the furnace is about 1000° F. The mold is maintained in this zone until the mass has attained a temperature of about 1000° F., generally requiring about 30 minutes. The mold now is removed from the furnace, and the product is stripped from the mold. The product then is delivered directly to an annealing furnace where the temperature is about 850° F. and gradually is reduced to about 200° F. to 300° F. to anneal the product in about twelve to fourteen hours.

An expanded, substantially white product is produced which is hard, strong, and abrasion resistant. The product has a very regular cell structure, with the cells quite small. The density of the product is in the order of about 11 pounds per cubic foot. The cells are generally interconnected or intercommunicating, making the product well suited for fabrication into sound-absorbing tiles which may be mechanically fissured, perforated, or otherwise decorated. The product will be useful also for some thermal insulation services and for other uses where an inorganic porous or cellular product is required.

The proportioning of alumina to the reground batch may be varied. Generally, from 1% to 5% of alumina, based on the weight of the reground batch, provides substantial improvement in the hardness, strength, and fine cell formation. Quantites up to 10% or more can be added, but the improvements in physical characteristics are not proportional in increases much above 5%. Quantities much above 10% may prevent proper vitrification of the volcanic glass and otherwise deleteriously affect the quality of the finished product.

The refiring temperature required will depend to some extent at least upon the quantity of alumina added to the reground volcanic glass, larger amounts of alumina requiring higher refiring temperatures. Refiring temperatures in the range of about 1400° F. to about 2000° F. generally are satisfactory. With proportioning of the alumina in the range of 1% to 5% on the weight of the reground volcanic glass, refiring temperatures in the range of about 1400° F. to about 1750° F. are preferred.

The reason for the improvements in physical characteristics resulting from practice of the invention are not fully understood, but one theory is that the alumina does not combine with the reground batch until substantial softening of the batch has occurred during the refiring operation. As refiring continues, more and more of the alumina is combined with the softened volcanic glass, and as this occurs and the mass continues to soften, the alumina which is combined with the volcanic glass tends to toughen it and prevent collapse of the mass and at the same time limit the expansion of the gas within the mass, thus creating relatively small cells or pores with thin walls which eventually rupture and provide intercommunication between the cells or pores. Regardless of theory, however, it has been found that an improved quality product, having greater thermal shock resistance, hardness, and strength, is produced by practice of the present invention and that a very fine cell or pore structure is obtained.

We claim:

1. In a method of making a foamed and expanded volcanic glass product from a reground powder formed of fired, fluxed, and expanded volcanic glass having chemically and physically combined therein a fluxing and gassing agent, the improvement which comprises adding to said reground powder from about 1% to about 10%, based on the weight of the reground powder of alumina in finely divided form, refiring the resulting batch within a temperature range of about 1400° F. to about 2000° F. to form a foamed and substantially expanded product, and then annealing the product.

2. In a method of making a foamed and expanded volcanic glass product from a reground powder formed of a fired, fluxed, and expanded volcanic glass having chemically and physically combined therein a fluxing and gassing agent, the improvement which comprises adding to said reground powder from about 1% to about 5%, based on the weight of the reground powder of alumina in finely divided form, refiring the resulting batch within a temperature range of about 1400° F. to about 1750° F. to form a foamed and substantially expanded product, and then annealing the product.

3. In a method of making a foamed and expanded volcanic glass product from a reground powder formed of a fired, fluxed, and expanded volcanic glass having chemically and physically combined therein a fluxing and gassing agent, the improvement which comprises substantially uniformly mixing with said reground powder about 3%, based on the weight of the reground powder, of alumina in finely powdered form, refiring the resulting batch within a temperature range of about 1500° F. to about 1550° F. to form a foamed and substantially expanded product, and then annealing the product.

References Cited in the file of this patent

UNITED STATES PATENTS

| | | |
|---|---|---|
| 1,108,007 | Ribbe | Aug. 18, 1914 |
| 2,060,017 | Benner | Nov. 10, 1936 |
| 2,123,536 | Long | July 12, 1938 |
| 2,209,170 | Nevin et al. | July 23, 1940 |